United States Patent [19]

Price

[11] 4,061,414

[45] Dec. 6, 1977

[54] KALEIDOSCOPIC APPARATUS

[76] Inventor: Bruce D. Price, 924 W. End Ave., New York, N.Y. 10025

[21] Appl. No.: 623,024

[22] Filed: Oct. 16, 1975

[51] Int. Cl.² .................................................. G02B 27/08
[52] U.S. Cl. .................................................. 350/4; 353/1
[58] Field of Search ................ 350/4, 292, 299; 353/1

[56] References Cited

U.S. PATENT DOCUMENTS

| 1,110,296 | 9/1914 | Wiley | 350/4 |
| 2,452,363 | 10/1948 | Flotron | 350/4 |
| 2,697,380 | 12/1954 | Wyser | 350/44 |

FOREIGN PATENT DOCUMENTS 457,496  5/1950  Italy ............................................ 350/4

Primary Examiner—Richard A. Wintercorn
Attorney, Agent, or Firm—Philip D. Amins

[57] ABSTRACT

A Kaleidoscopic apparatus comprising an elongated substantially tubular housing having different shaped geometric openings at the ends thereof and provided with a plurality of longitudinal planar members fabricated of non-breakable material disposed within said tubular housing.

10 Claims, 9 Drawing Figures

KALEIDOSCOPIC APPARATUS

The present invention pertains to a new and novel kaleidoscopic apparatus for use as a toy or souvenir.

BACKGROUND OF THE INVENTION

Heretofore, there have been provided kaleidoscopic assemblies of various complexity of construction employing sophisticated optical systems fabricated of breakable mirror and lens components, such as glass. The problems encountered in the manufacture, sale and use of these assemblies were with the cost, difficulty of construction and fragileness thereof. Thus, their use by children was extremely precarious and, usually, short lived. Moreover, the use of glass rendered the same extremely dangerous for use by children due to the distinct possibility of breakage and subsequent chance of cutting of the child's extremities.

SUMMARY OF THE INVENTION

Accordingly, it is the primary object of the present invention to provide a kaleidoscopic apparatus fabricated completely from non-breakable material.

It is another object of the present invention to provide a kaleidoscopic apparatus of the foregoing type having a substantially elongated tubular configuration having viewing apertures formed at each end thereof.

It is a further object of the present invention to provide a kaleidoscopic apparatus as aforementioned wherein the viewing apertures at the end of the tubularly configured housing are of different geometric configuration.

It is still another object of the present invention to provide a kaleidoscopic apparatus of the previously described type having a plurality of longitudinal members disposed within said tubular housing, wherein all of said members are disposed in abuttingly engaged relationship.

It is yet another object of the present invention to provide a kaleidoscopic assembly of the foregoing type wherein the longitudinal members are fabricated from non-breakable material.

It is still a further object of the present invention to provide a kaleidoscopic assembly as previously described, wherein the longitudinal members are fabricated from a material having internal reflective surfaces which are internally disposed within said tubular housing.

BRIEF DESCRIPTION OF THE DRAWINGS

The foregoing and other objects, features and advantages of the present invention will become more apparent from the detailed description hereinafter considered in conjunction with the following drawings, wherein.

DETAILED DESCRIPTION OF THE PREFERRED EMBODIMENTS

Figure 1:
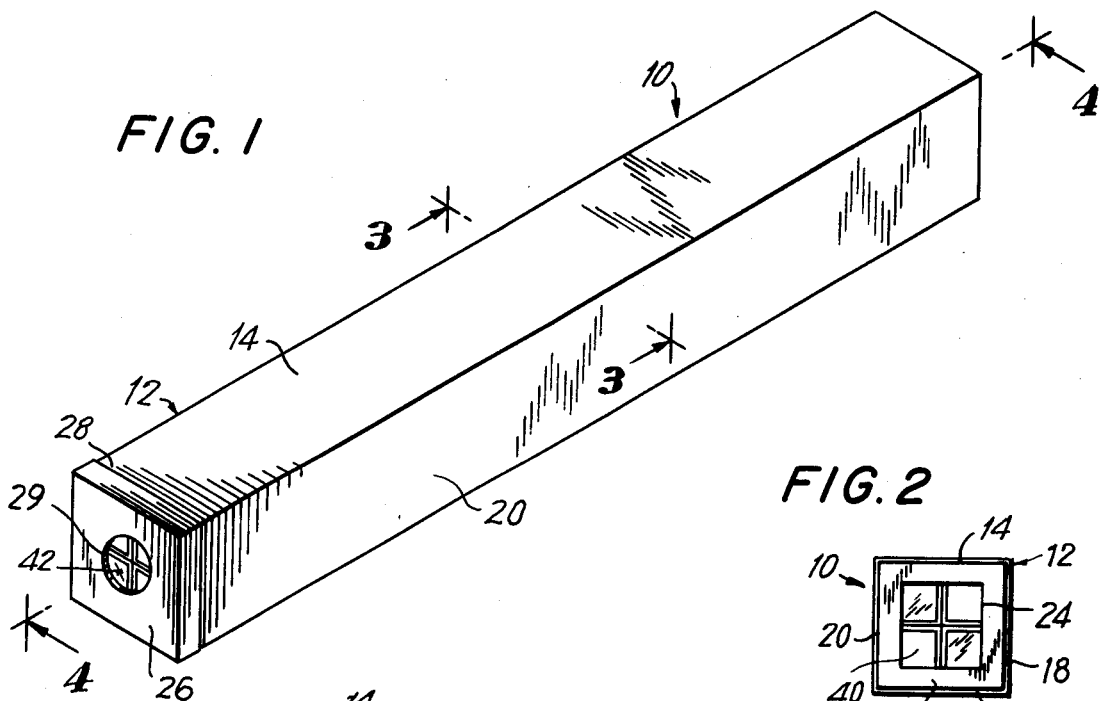
FIG. 1 is a perspective view of a kaleidoscopic assembly constructed in accordance with the present invention.
Figure 2:
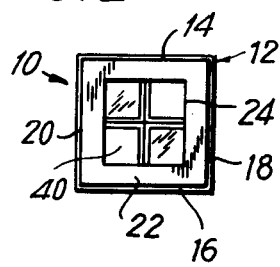
FIG. 2 is a rear end view of the kaleidoscopic assembly depicted in FIG. 1.
Figure 3:
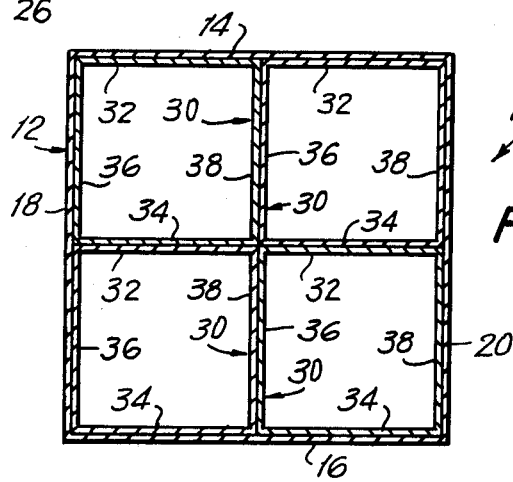
FIG. 3 is a lateral sectional view taken on the line 3—3 of FIG. 1.
Figure 4:
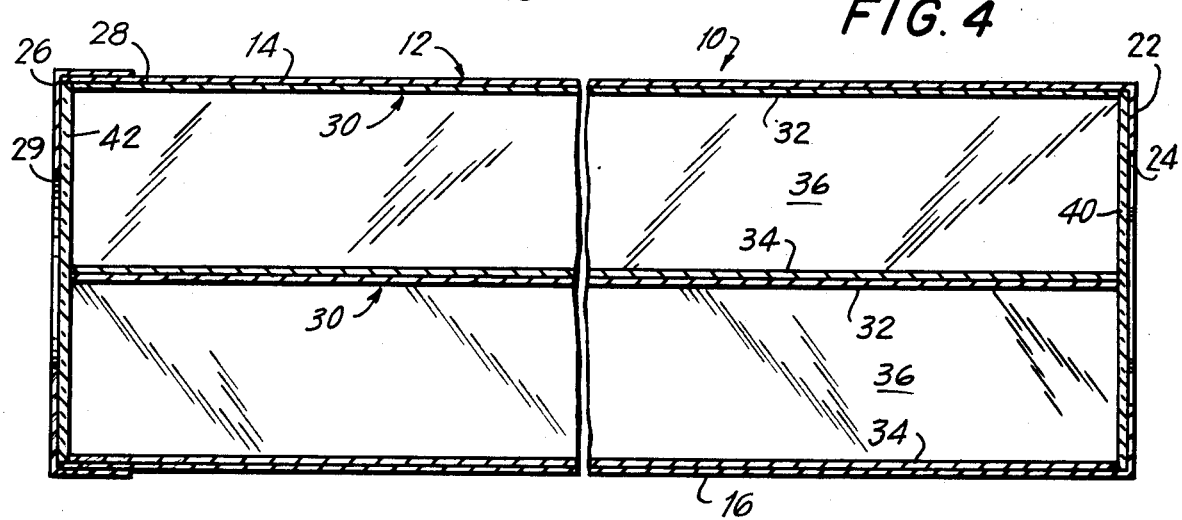
FIG. 4 is a longitudinal sectional view taken on the line 4—4 of FIG. 1.

Referring now to the drawings, and more particularly to FIGS. 1 through 4 thereof. There is depicted the kaleidoscopic apparatus of the present invention, generally denoted by the reference numeral 10. The kaleidoscopic apparatus comprises an elongated tubular housing portion 12 having a substantially rectangular configuration. The housing 12 has an upper wall 14, a lower wall 16 and has left and right side walls 18 and 20, respectively. The housing 12 also includes an integrally formed rear end wall 22 having a rectangular or square viewing aperture 24 centrally disposed within the end wall 22. The front end wall 26 is in the form of a cap member which is positionally disposed and fitted upon the front portion 28 of the housing 12. The cap 26 is provided with a circular front viewing aperture 29 centrally disposed therewithin. It is herein to be noted that the end cap 26 may be placed upon the front end portion 28 by a force fit, cement or by any other suitable manner of securement, as is well known to those skilled in the art. Disposed within the housing portion 12 are four elongated rectangular tubular members generally denoted by the reference numeral 30. Each of the rectangular members 30 are preferably formed having a square cross-section, as best seen in FIG. 3. The members 30 include upper walls 32, bottom walls 34 and left and right side walls 36 and 38, respectively. The members 30 are disposed within the housing 12 in contiguous abutting engagement such that each of said members has at least two of the walls thereof disposed in juxtapositional relationship with the other of said tubular members.

The kaleidoscopic apparatus 10 also include a transparent rear member 40 positioned within the housing 12 immediately adjacent the rear edges of the four rectangular members 30. A transparent front member 42 is disposed within the housing 12 between the end cap 26 and the front edges of the four rectangular members 30.

The tubular housing 12 may be fabricated from wood, plastic or metal material. If the housing is fabricated of a plastic material, the same may be extruded or molded in a manner whereby the rear end cap 22 is formed integrally therewith. In the event the housing 12 is fabricated from wood and metallic material, then the cap 22 would be made separate from the housing 12 and may be secured thereto in a manner similar to that disclosed hereinbefore in conjunction with the front end cap 26. The rectangular members 30 are preferentially formed of a metallic or plastic material whereby the walls 32, 34, 36 and 38 are reflective.

Figure 5:
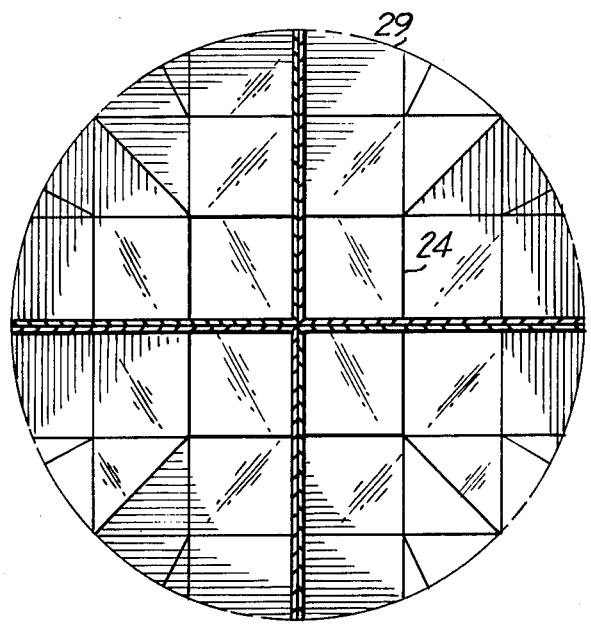
FIG. 5 is an optical view as seen by a viewer looking through the front end wall circular aperture of the kaleidoscopic assembly depicted in FIG. 1.
Figure 6:
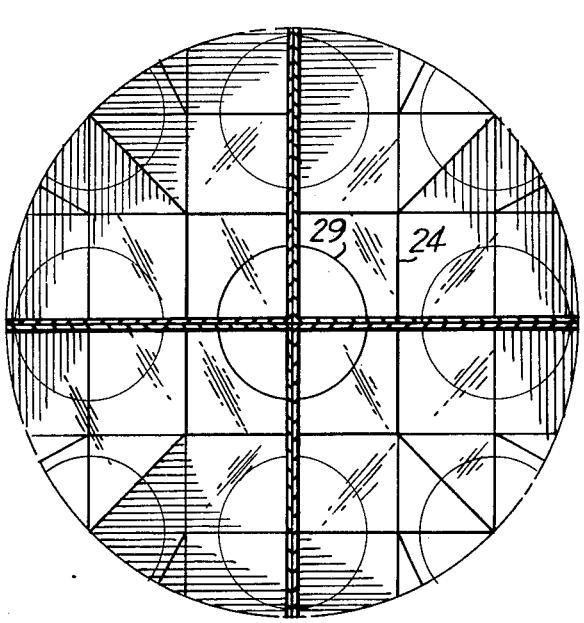
FIG. 6 is an optical view as seen by a viewer looking through the rear end wall rectangular aperture of the kaleidoscopic assembly and as previously illustrated in FIG. 2.

The resultant kaleidoscopic effect is depicted in limited optical form in FIGS. 5 and 6. With reference to FIG. 5, which is the effect produced when a viewer peers through the front central aperture 29, there is produced a plurality of rectangular kaleidoscopic images. When a viewer looks through the square opening 24 in the rear end wall 22 of the apertures 10, the resultant kaleidoscopic effect is a plurality of circular and rectangular images, as illustrated in FIG. 6.

Figure 7:
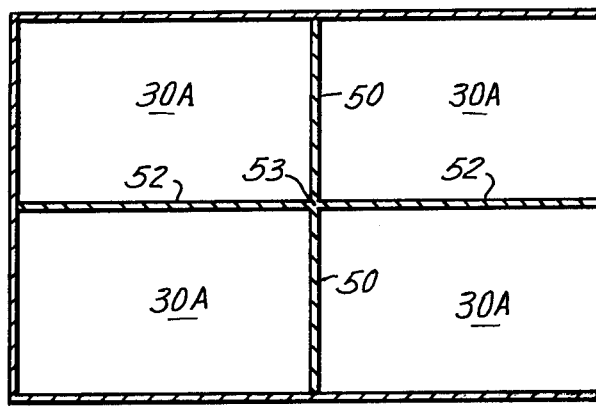
FIG. 7 is a sectional view similar to FIG. 3 depicting a second embodiment of the present invention.

Reference is now directed to FIG. 7, wherein a second embodiment of the present invention is illustrated, and wherein similar parts are denoted by similar reference numerals. In this embodiment the housing 12A is provided with four planar members 50 and 52, respectively, mutually joined at intersection point 53. This construction effectively divides the housing portion into four rectangular areas 30A, thereby simulating the four rectangular tubular members 30 discussed hereinbefore in conjunction with FIGS. 1 through 4.

Figure 8:
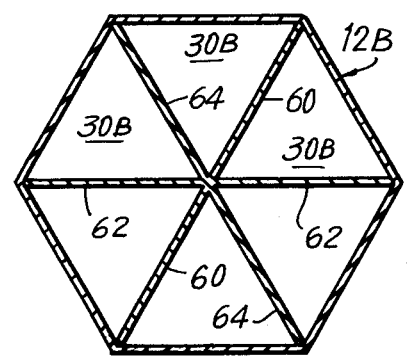
FIG. 8 is a sectional view similar to FIG. 3 depicting a third embodiment of the present invention.

A third embodiment of the present invention is depicted in FIG. 8 wherein the housing 12B is formed having a hexagonal cross section. Disposed within the housing 12B are six intersecting planar members 60, 62 and 64. The six intersecting planar members from, in conjunction with the housing 12B, triangular portions 30B. The triangular portions 30B in conjunction with the front and rear viewing apertures present very interesting and varied kaleidoscopic effects.

Figure 9:
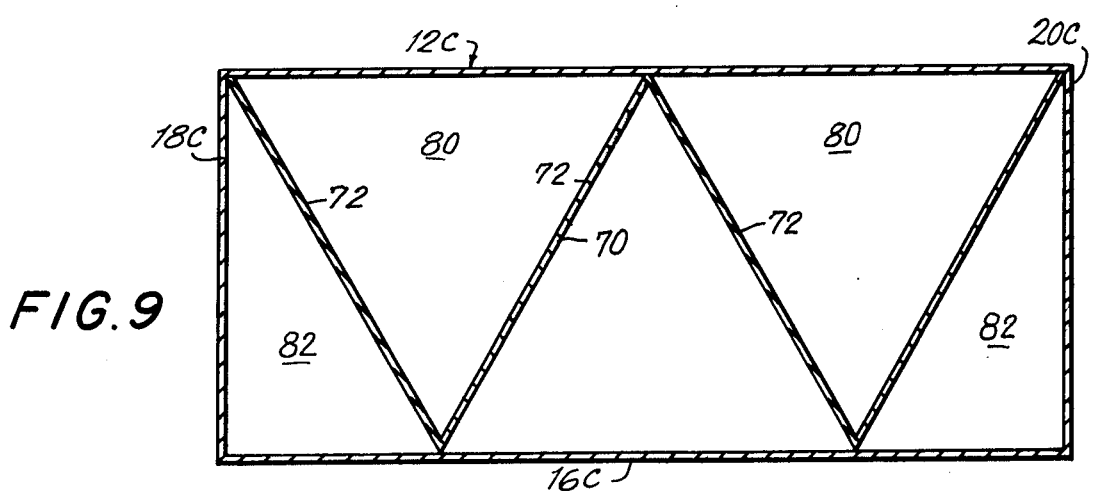
FIG. 9 is a sectional view similar to FIG. 3 depicting a fourth embodiment of the present invention.

A fourth embodiment of the present invention is depicted in FIG. 9 wherein the housing 12C is provided with a corrugated insert having a sawtooth configuration and generally denoted by the reference numeral 70. The corrugated member 70 comprises a plurality of intersecting planar members 72 which form in conjunction with each other and the housing 12C equilateral triangular portions 80; and which members 72 form, in conjunction with the side wall portions 18C, 20C and the bottom wall portion 16C, right triangular portions 82.

It will thus be apparent to those skilled in the art, that the present construction provides a new and novel kaleidoscopic apparatus of simplified non-breakable construction, having no moving parts, and capable of inexpensive manufacture for use as a toy or souvenir.

While I have shown and described the preferred embodiments of my invention, it will be apparent to those skilled in the art that there are many modifications, improvements and changes which may be made therein without departing from the spirit and scope of the invention.

What is claimed is:

1. A kaleidoscopic apparatus comprising
    an elongated substantially tubular housing,
    a plurality of planar members having reflective surfaces disposed internally within and extending longitudinally of said tubular housing and substantially dividing the entire cross-sectional interior thereof into predetermined geometric cross-sectional areas, and
    said housing including front and rear wall members having first and second viewing apertures, respectively, formed therein.
2. A kaleidoscopic apparatus as in claim 1, wherein said first and second viewing apertures have different geometric configurations.
3. A kaleidoscopic apparatus as in claim 2, wherein said tubular housing and said planar members are fabricated of non-breakable material.
4. A kaleidoscopic apparatus as in claim 3, wherein said planar members are disposed in mutual right angle relationship forming rectangular geometric cross-sectional areas.
5. A kaleidoscopic apparatus as in claim 4, wherein said planar members are formed by a plurality of rectilinear parallelepiped members,
    said parallelepiped members being disposed in abutting engagement within said tubular housing,
    each of said parallelepiped members having at least two sides thereof in abutting mutually coextensive relationship with the other of said parallelepiped members, and
    each of said parallelepiped members having at least two sides thereof disposed in abutting engagement with the interior surface of said elongated tubular housing.
6. A kaleidoscopic apparatus as in claim 2, including
    a transparent member positionally disposed between the front end wall and the front edges of said planar members.
    a transparent member positionally disposed between the rear end wall and the rear edges of said planar members, and
    each of said transparent members being fabricated of a non-breakable material.
7. A kaleidoscopic apparatus as in claim 6, wherein said first and second viewing apertures have areas smaller than said front end wall and said second end wall, respectively.
8. A kaleidoscopic apparatus as in claim 7, wherein said first viewing aperture has a substantially circular configuration and said second viewing aperture has a substantially rectangular configuration.
9. A kaleidoscopic apparatus as in claim 2, wherein said elongated tubular housing has a hexagonal cross-sectional area,
    said planar members comprise three mutually intersecting members, and
    said three mutually intersecting members in conjunction with the interior of said housing forming six equilateral triangles having a common apex.
10. A kaleidoscopic apparatus as in claim 2, wherein said planar members are disposed within the interior of said tubular housing in a corrugated sawtooth pattern,
    said planar members in conjunction with the interior of said tubular housing forming a cross-sectional area comprised of a plurality of right triangular and equilateral triangular configurations which are disposed in adjacent relationship.

* * * * *